(12) United States Patent
Ohashi et al.

(10) Patent No.: US 7,725,611 B2
(45) Date of Patent: *May 25, 2010

(54) METHOD AND APPARATUS FOR VERIFYING DATA IN A STORAGE SYSTEM

(75) Inventors: Kazunobu Ohashi, Odawara (JP); Takao Satoh, Odawara (JP); Kiichiro Urabe, Isehara (JP); Toshio Nakano, Chigasaki (JP); Shizuo Yokohata, Ninomiya (JP)

(73) Assignee: Hitachi, Ltd., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 12/173,650

(22) Filed: Jul. 15, 2008

(65) Prior Publication Data

US 2008/0288829 A1    Nov. 20, 2008

Related U.S. Application Data

(63) Continuation of application No. 11/025,471, filed on Dec. 28, 2004, now abandoned, which is a continuation of application No. 10/377,898, filed on Feb. 28, 2003, now Pat. No. 6,842,793.

(30) Foreign Application Priority Data

Mar. 28, 2002    (JP) ............................. 2002-092685

(51) Int. Cl.
*G06F 12/00* (2006.01)
*G06F 12/14* (2006.01)
*G06F 3/06* (2006.01)
*G06F 13/00* (2006.01)

(52) U.S. Cl. .................. 710/7; 710/1; 710/3; 710/4; 710/5; 710/9; 710/36; 710/55; 710/62; 710/64; 710/72; 710/74; 711/1; 711/100; 711/173

(58) Field of Classification Search ............... None
See application file for complete search history.

(56) References Cited

U.S. PATENT DOCUMENTS 5,285,456 A    2/1994    Cheney et al.

(Continued)

FOREIGN PATENT DOCUMENTS

EP    1 170 657    1/2002

(Continued)

OTHER PUBLICATIONS

Engineering White Paper, EMC Oracle, EMC Double Checksum for Oracle, Nov. 1, 2001.*

(Continued)

*Primary Examiner*—Tanh Q Nguyen
(74) *Attorney, Agent, or Firm*—Brundidge & Stanger, P.C.

(57) ABSTRACT

A method for verifying data in a storage system is disclosed. A host computer transmits area management data to a storage controller. The area management data specifies a range of a storage area in a storage device to be used by an application program having a mechanism for verifying data suitability. Upon receipt of an input/output request transmitted from the host computer, the storage controller performs verification, which is usually performed by the application program, of the data that is to be processed according to the data input/output request and to be input/output to/from the storage area, which is specified in accordance with the received area management data.

12 Claims, 8 Drawing Sheets

U.S. PATENT DOCUMENTS

| | | | |
|---|---|---|---|
| 5,588,012 A * | 12/1996 | Oizumi | 714/805 |
| 5,867,736 A | 2/1999 | Jantz | |
| 5,870,537 A | 2/1999 | Kern et al. | |
| 5,951,658 A | 9/1999 | Daray, Jr. et al. | |
| 6,151,685 A | 11/2000 | Li et al. | |
| 6,167,485 A | 12/2000 | Kedem | |
| 6,185,634 B1 | 2/2001 | Wilcox | |
| 6,195,761 B1 | 2/2001 | Kedem | |
| 6,295,575 B1 | 9/2001 | Blumenau | |
| 6,311,240 B1 | 10/2001 | Boone et al. | |
| 6,363,462 B1 | 3/2002 | Bergsten | |
| 6,393,540 B1 | 5/2002 | Blumenau et al. | |
| 6,467,023 B1 | 10/2002 | DeKoning et al. | |
| 6,611,923 B1 | 8/2003 | Mutalik et al. | |
| 6,629,199 B1 | 9/2003 | Vishlitzy et al. | |
| 6,629,273 B1 | 9/2003 | Patterson | |
| 6,715,036 B1 | 3/2004 | Burton et al. | |
| 6,718,447 B2 | 4/2004 | Cochran | |
| 6,772,289 B1 * | 8/2004 | Corrigan | 711/118 |
| 6,886,171 B2 | 4/2005 | MacLeod | |
| 6,968,479 B2 | 11/2005 | Wyatt et al. | |
| 2001/0020254 A1 | 9/2001 | Blumenau | |
| 2002/0002661 A1 | 1/2002 | Blumenau et al. | |
| 2002/0052985 A1 | 5/2002 | Furuumi et al. | |
| 2002/0073279 A1 | 6/2002 | Sasamoto et al. | |
| 2002/0169995 A1 | 11/2002 | Archibald, Jr. et al. | |
| 2003/0093633 A1 | 5/2003 | Thiesfeld et al. | |
| 2003/0140288 A1 | 7/2003 | Loaiza et al. | |
| 2003/0145167 A1 | 7/2003 | Tomita | |
| 2003/0172325 A1 | 9/2003 | Wyatt et al. | |
| 2003/0191873 A1 | 10/2003 | Araki et al. | |

FOREIGN PATENT DOCUMENTS

| | | |
|---|---|---|
| JP | 63-061320 | 3/1988 |
| JP | 08-263223 | 10/1996 |
| JP | 2000-267254 | 9/2000 |
| JP | 2001-331323 | 11/2001 |
| JP | 8-272625 | 10/2006 |

OTHER PUBLICATIONS

"Data Path Conditioning: Extending Library Management Services to Improve Backup Performance and Reliability in Storage Networks", White Paper from Advanced Digital Information Corporation (ADIC) Redmond, WA 98052.

* cited by examiner

| | | |
|---|---|---|
| LOGICAL VOLUME ID | 001h | 210 |
| OS CONTROL INFORMATION OFFSET | 0000h | 211 |
| OS CONTROL INFORMATION SIZE | 1024byte | 212 |
| LOGICAL VOLUME CONTROL INFORMATION OFFSET | 1024byte | 213 |
| LOGICAL VOLUME CONTROL INFORMATION SIZE | 512byte | 214 |
| LOGICAL DEVICE ID | A, A' | 215 |
| APPLICATION ID | α | 216 |
| APPLICATION HANDLING DATA SIZE | 1024 | 217 |
| STRIPE SIZE | 4096 | 218 |
| TOTAL DATA SIZE | 100GB | 219 |

FIG. 2

METHOD AND APPARATUS FOR VERIFYING DATA IN A STORAGE SYSTEM

CROSS-REFERENCE TO RELATED APPLICATIONS

This is a continuation application of U.S. Ser. No. 11/025,471, filed Dec. 28, 2004, now abandoned, which is a continuation application of U.S. Ser. No. 10/377,898, filed Feb. 28, 2003, now U.S. Pat. No. 6,842,793, issued Jan. 11, 2005. The present application claims priority upon Japanese Patent Application No. 2002-092685 filed Mar. 28, 2002, which is herein incorporated by reference.

BACKGROUND OF THE INVENTION

1. Field of the Invention

The present invention relates to a method for verifying data in a storage system, a host computer and a storage controller in a storage system.

2. Description of the Related Art

A storage system in which a host computer and a storage controller such as a disk array device are interconnected via a SAN (Storage Area Network) or other networks for intensive storage operation or other similar purposes have been attracting considerable attention. Storage systems configured as above are now being operated at IDCs (Internet Data Centers) and many other places. Recently, focus has been made on systems that use a storage controller called a NAS (Network Attached Storage) which is provided with a file system and uses a LAN (Local Area Network) as the network.

It is often required that the data for database software or other application programs running on a host computer in a storage system configured and operated as described above is in accordance with certain specifications (such a property is hereinafter referred to as "suitability"). Under these circumstances, some application programs are provided with an algorithm for verifying the suitability of the data to be processed.

Even if an application program is provided with the above-mentioned algorithm, however, the data suitability may be lost depending on the SAN or other communication path for connecting a host computer to a storage controller or due to an internal process performed by the storage controller. Further, the storage controller is frequently shared by a plurality of host computers. In such a situation, the data suitability may be impaired if, for instance, an application program running on one host computer inadvertently accesses the data of an application program running on another host computer.

If, for instance, the suitability of the data to be written into a storage controller is lost in a situation in which an application program is not involved, the storage controller will not be able to recognize such a loss of data suitability and will automatically store the unsuitable data. In this instance, the application program will not recognize the loss of data suitability until it reads the data later. If there is a long time lag between the instant at which the data is written and the instant at which the data is read, data recovery may be difficult to achieve.

Even in situations where data is backed up by the storage controller, data recovery win not be achievable if the backed-up data has already lost suitability. Further, if the data suitability is lost in a situation in which an application program is not involved as mentioned above, the cause of the problem is often difficult to specify so that subsequent failure recovery and other similar operations may be rendered difficult to accomplish.

The above problem can be solved if the storage controller is configured to verify the data. In storage systems, data stored in the storage controller by an application program is generally provided with additional information such as information added by an operating system (hereinafter referred to as the "OS") running on a host computer and information about volumes having been logically organized by a host computer. Further, for example, due to the OS, volume management program, etc., the data stored in the storage controller by an application program is not arranged in a manner in which the data on a host computer is arranged for reference by the application program. However, the storage controller would not be able to get hold of the above-mentioned information and arrangement. That is, as far as the traditional storage system scheme is used, the data verification process performed by an application program cannot be performed by the storage controller. If it were to allow the storage controller to accomplish such data verification, it would be necessary to establish a scheme that would enable the storage controller to acquire relevant information from an application program, OS, and volume management program.

As a scheme to facilitate the checking procedure for enhancement of data reliability, i.e., RAS (Reliability, Availability, and Serviceability), which is conducted when an application program reads data from or writes data onto a magnetic disk, for example, Japanese Patent Application Laid-open Publication No. 8-263223 discloses a mechanism in which the CPU generates RAS data when an I/O operation is performed by an application program and attaches the RAS data to data to be written onto a magnetic disk, in order to enable a magnetic disk input/output channel and magnetic disk controller to conduct a data check.

In the scheme disclosed in the above-mentioned publication, however, the RAS data is independently generated by the CPU and appended to the data to be written. Further, the RAS data does not relate to the data suitability required by an application program. The disclosed scheme is not configured to recognize such information or configuration nor to verify the suitability demanded by individual application programs running on a host computer.

SUMMARY OF THE INVENTION

The present invention is made to solve the foregoing and other problems, and it is an object of the present invention to provide a data verification method for verifying and assuring data suitability in a storage system with increased accuracy and, more particularly, to offer a method for carrying out, in a storage system, data verification demanded by an application program.

It is a further object of the present invention to provide a host computer and storage controller that realize the above-mentioned functionality.

According to one aspect of the present invention, which achieves the foregoing and other objects, there is provided a method for verifying data in a storage system, the storage system including a host computer and a storage controller, the storage controller being connected to the host computer for communication therewith, being capable of receiving an input/output request transmitted from the host computer, and, according to the request, being capable of performing a data input/output process to a storage device, the method comprising the steps of: the host computer executing an application program for organizing and managing data to be stored in the storage controller in accordance with a predefined specification; the host computer transmitting area management data to the storage controller, wherein the area management data is for specifying a range of a storage area that is provided in the storage device to be used by the application program; the storage controller receiving the area management data; and the storage controller receiving a data input/output request that is transmitted from the host computer caused by a process performed by the application program, and verifying whether data that is to be processed according to the received data input/output request and to be input/output to/from the storage area used by the application program, which is specified in accordance with the area management data, is organized in accordance with the predefined specification.

According to such an aspect of the present invention, it becomes possible to offer a data verification method, a host computer, and a storage controller for verifying and assuring the data suitability in a storage system with increased accuracy.

Features and objects of the present invention other than the above will become clear by reading the description of the present specification with reference to the accompanying drawings.

BRIEF DESCRIPTION OF THE DRAWINGS

For more complete understanding of the present invention and its advantages, reference is now made to the following description taken in conjunction with the accompanying drawings, in which:

FIG. 2 is a diagram showing an area management table according to an embodiment of the present invention;

DETAILED DESCRIPTION OF THE PREFERRED EMBODIMENTS

Figure 1:
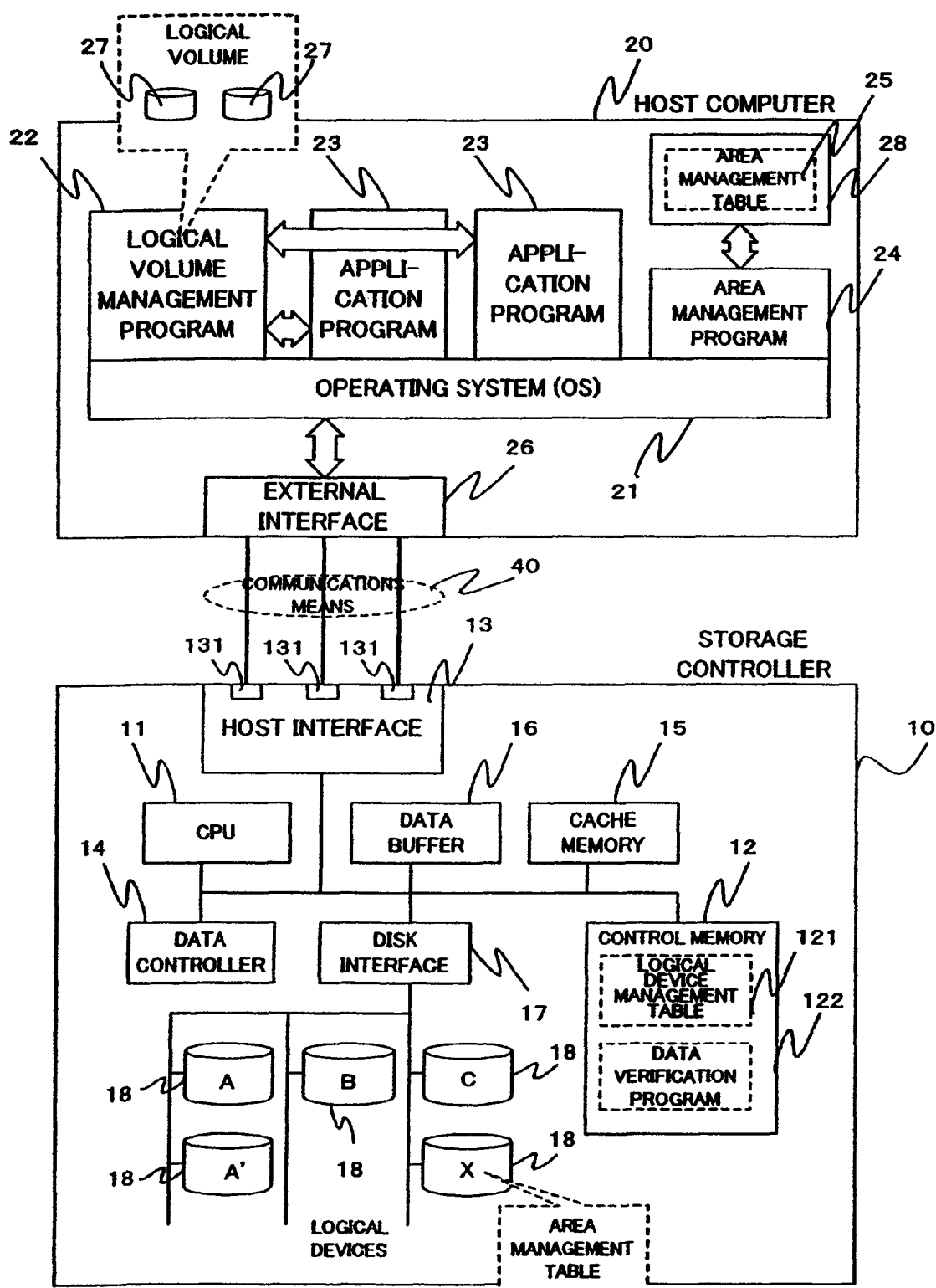
FIG. 1 is a diagram illustrating the configuration of a storage system according to an embodiment of the present invention.

At least the following matters will be made clear by the explanation in the present specification and the description of the accompanying drawings.

=Outline of General Description=

A method for verifying data according to an embodiment of the present invention is a method for verifying data in a storage system, the storage system including a host computer and a storage controller, the storage controller being connected to the host computer for communication therewith, being capable of receiving an input/output request transmitted from the host computer, and, according to the request, being capable of performing a data input/output process to a storage device, comprising the steps of: the host computer executing an application program for organizing and managing data to be stored in the storage controller in accordance with a predefined specification; the host computer transmitting area management data to the storage controller, wherein the area management data is for specifying a range of a storage area that is provided in the storage device to be used by the application program; the storage controller receiving the area management data; and the storage controller receiving a data input/output request that is transmitted from the host computer caused by a process performed by the application program, and verifying whether data that is to be processed according to the received data input/output request and to be input/output to/from the storage area used by the application program, which is specified in accordance with the area management data, is organized in accordance with the predefined specification.

The "input/output request transmitted from the host computer" is, for instance, a data write request or data read request for the above-mentioned storage device such as a disk drive included in a storage controller or externally connected to the storage controller. The "area management data" is the data registered in an area management table, which is described later. The data verification method according to the present invention verifies, also in the storage controller, whether the data handled by application programs are organized in accordance with a predefined specification. This ensures that the data suitability can be verified and assured with increased accuracy.

The data verification method mentioned above may comprise the steps of: the storage controller storing a plurality of algorithms, wherein each of the algorithms is for performing the verification for each of a plurality of application programs running on the host computer; the storage controller specifying storage areas used by each of the application programs in accordance with the area management data transmitted from the host computer; the storage controller receiving a data input/output request transmitted from the host computer caused by a process performed by one of the application programs, and specifying the application program relating to the received data input/output request in accordance with the area management data; and the storage controller verifying, using the algorithm provided for the specified application program, whether data that is to be processed according to the received data Input/output request and to be input/output to/from the storage area, which is specified in accordance with the area management data, is organized in accordance with the predefined specification.

Accordingly, it becomes possible to verify, also on the storage controller side, the data handled by different application programs even when a plurality of different application programs run on the host computer.

The data verification method described above may comprise the steps of: the host computer transmitting the algorithm from the host computer to the storage controller; and the storage controller receiving and storing the algorithm.

The data verification method described above may comprise the step of the host computer transmitting, when a change has been made in the range of the storage area, the area management data reflecting the change to the storage controller. Accordingly, it becomes possible to ensure that also the storage controller can get hold of the latest information about the storage area of the storage device for use by an application program.

The storage area in the storage device used by the application program may be an area excluding an area used by control information added by software other than the application program running on the host computer.

The area management data may include data for designating a range of the storage area that is provided for the application program as a volume having been logically organized using the storage area of the storage device.

The volume may be organized by managing the storage area of the storage device according to a RAID method.

The storage device may be provided integrally with the storage controller. Further, the data indicating the result of the verification may be transmitted to the host computer. For example, the storage area may be provided as a logical storage device that is organized in a physical storage region provided by at least one physical storage device. The predefined specification means, for example, that prescribed data is inserted into a prescribed position of the data. The storage controller may be connected to the host computer for communication therewith via a communication line conforming to the SCSI standard, via a SAN, or via a LAN.

Further, an alternative configuration may be used so that the transmission of the area management data from the host computer to the storage controller is performed via a communication path other than a communication path for connecting the storage controller and the host computer. The use of such an alternative configuration will enable, for instance, communication load distribution.

EMBODIMENTS

FIG. 1 shows the configuration of a storage system according to an embodiment of the present invention.

For example, a storage controller 10 shown in this figure is a disk array device and a host computer 20 is a mainframe computer or a personal computer that uses the storage controller 10 as a storage resource. The storage controller 10 is connected to the host computer 20 via a communications means 40. For example, the communications means 40 is a communication line conforming to the SCSI interface standard, a LAN (Local Area Network), or a SAN (Storage Area Network).

The storage controller 10 may include the following: a CPU 11 for controlling the various parts and functions in the storage controller 10 and executing and controlling various processing programs; a control memory 12 for storing various information; physical devices (not shown), such as disk drives, that serve as "storage devices"; a host interface 13, which may serve as "means for receiving area management data" and/or "means for receiving a data input/output request", for connecting to the host computer 20; a data controller 14 for controlling the data input/output to/from the physical device in accordance with a data input/output request received from the host computer 20; a cache memory 15; a data buffer 16 for temporarily storing the data to be registered in the cache memory 15; and a disk interface 17 for controlling the physical devices in accordance with the instructions from the data controller 14.

The host interface 13 is equipped with one or more connection ports 131. An external interface 26 of the host computer 20 is, for instance, a Host Bus Adapter that serves as a channel interface and may function as "means for transmitting area management data".

In the storage controller 10, one or more logical devices 18 are organized in physical storage regions provided by the physical devices. Each organized logical device is assigned a unique logical device ID that can be used when the host computer 20 designates a storage area of the storage controller 10. In the present embodiment, it is assumed that five logical devices 18 are organized in the storage controller 10, each of which being designated by logical device IDs are A, A', B, C, and X.

An OS 21 runs on the host computer 20. On the OS 21, a logical volume management program 22, application programs 23, and an area management program 24 run.

Figure 8:
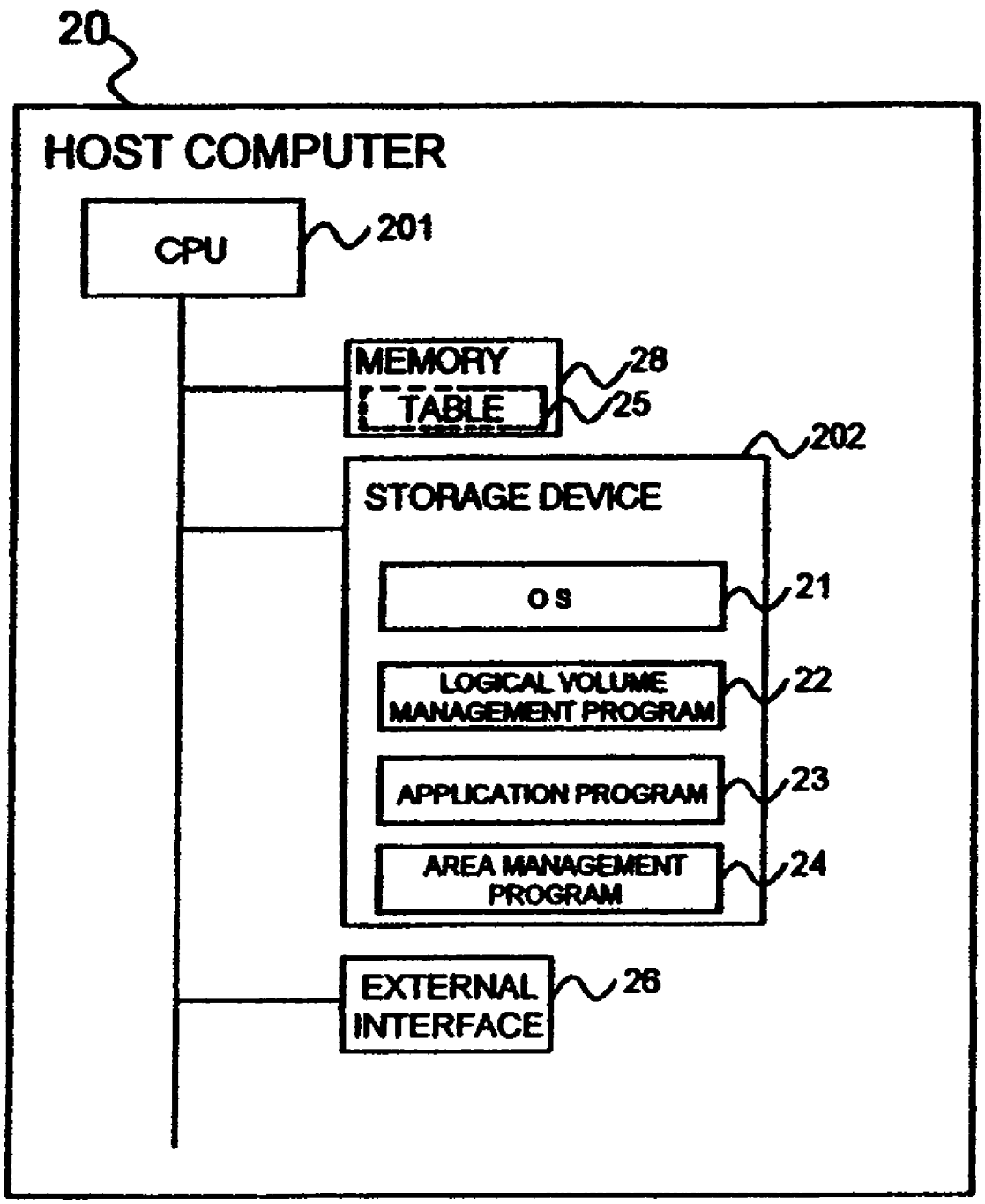
FIG. 8 is a block diagram that shows the configuration of an example of a host computer.

FIG. 8 is a block diagram that shows the configuration of the host computer 20. The host computer 20 comprises at least a CPU (Central Processing Unit) 201, a memory 28, a storage device 202, and the above-mentioned external interface 26.

The CPU 201 takes charge of the overall control of the host computer 20 and realizes various functions according to the present example by executing various programs stored in the memory 28. The storage device 202 can store various programs and data. For example, hard disk devices and the like may be used for the storage device 202. In the present example, the storage device 202 stores the OS 21, the logical volume management program 22, the application programs 23, and the area management program 24, details of which being explained later on.

The logical volume management program 22 organizes one or more logical volumes 27 in the logical storage regions of the logical devices 18 in the storage controller 10, and provides storage areas specified by the logical volumes 27 to the application programs 23. An example of the logical volume management program 22 may be a so-called SoftRAID program, which manages the storage areas provided by the logical devices of the storage controller 10 according to the RAID (Redundant Array of Independent Disks) method based on software and offers the resulting organized logical volumes 27 to the application programs 23. The following description assumes that a SoftRAID program is used as the logical volume management program 22.

For example, each application program 23 is a database software, which is provided with a scheme for organizing and managing the data to be stored in the storage controller 10 in accordance with a predefined specification, that is, a mechanism for verifying the suitability of the data. Each application program 23 is also provided with an algorithm for checking whether the data to be processed is organized in accordance with a predefined specification, that is, for verifying whether the data is suitable.

The area management program 24 manages an area management table 25 stored in a memory 28 of the host computer 20. Details on the area management table 25 are explained below. The area management program 24 is capable of transmitting the area management table 25 to the storage controller 10 at an appropriate timing. This will be described in detail later.

=Area Management Table=

FIG. 2 shows an example of an area management table 25. The area management table 25 is generated for each logical volume 27, which is organized by the logical volume management program 22. When, for instance, the relationship between the logical devices 18 and logical volumes 27 is changed by the logical volume management program 22, the area management program 24 updates the area management table 25 as necessary in accordance with the information acquired from the logical volume management program 22, the application programs 23 and the like.

In FIG. 2, a logical volume ID 210 is a unique identifier that is assigned to each logical volume 27. The logical volume ID indicates which logical volume 27 the area management table 25 corresponds to. An OS control information offset 211 and OS control information size 212 indicate the storage location in a logical device 18 for storing OS control information that is given by the OS 21 to manage the logical devices 18 and logical volumes 27. An example of the OS control information may be file control information.

A logical volume control information offset 213 and logical volume control information size 214 indicate the storage location in a logical device 18 for storing the logical volume control information that is generated by the logical volume management program 22 to manage the logical volumes 27. The logical volume control information is the information used by the logical volume management program 22 to manage the logical devices 18. An example of the logical volume control information may be stripe configuration information that is necessary when the logical volume management program 22 operates the logical devices 18 according to the RAID method.

A logical device ID 215 is an ID of a logical device 18 that composes a logical volume 27, and an application ID 216 is an ID of an application program 23 that uses that logical volume 27. A user, for instance, may register an application ID by operating the user interface of the host computer 20.

An application handling data size 217 is the size of data handled when an application program 23, which uses the logical volume 27, performs a data input/output operation to a logical volume 27. A stripe size 218 is the data size to be adopted when the logical volume management program 22 writes data on a logical device 18 by striping the data according to the RAID method. A whole data size 219 is the total storage capacity of the logical volume 27.

=Area Management Table Transmission=

The area management table 25 is transmitted from the host computer 20 to the storage controller 10 by the area management program 24 at an appropriate timing. An "appropriate timing" for such transmission may be, for example, when the host computer 20 is started up or when the area management table 25 is updated, or at a time that has been set to a scheduling function of the area management program 24.

Upon receipt of an area management table 25 from the host computer 20, the storage controller 10 stores the table in a logical device 18. In the present embodiment, although it is assumed that the area management table 25 is stored in a logical device 18 having a logical device ID "X", the area management table 25 may instead be stored in the control memory 12 or the like.

Figure 3:
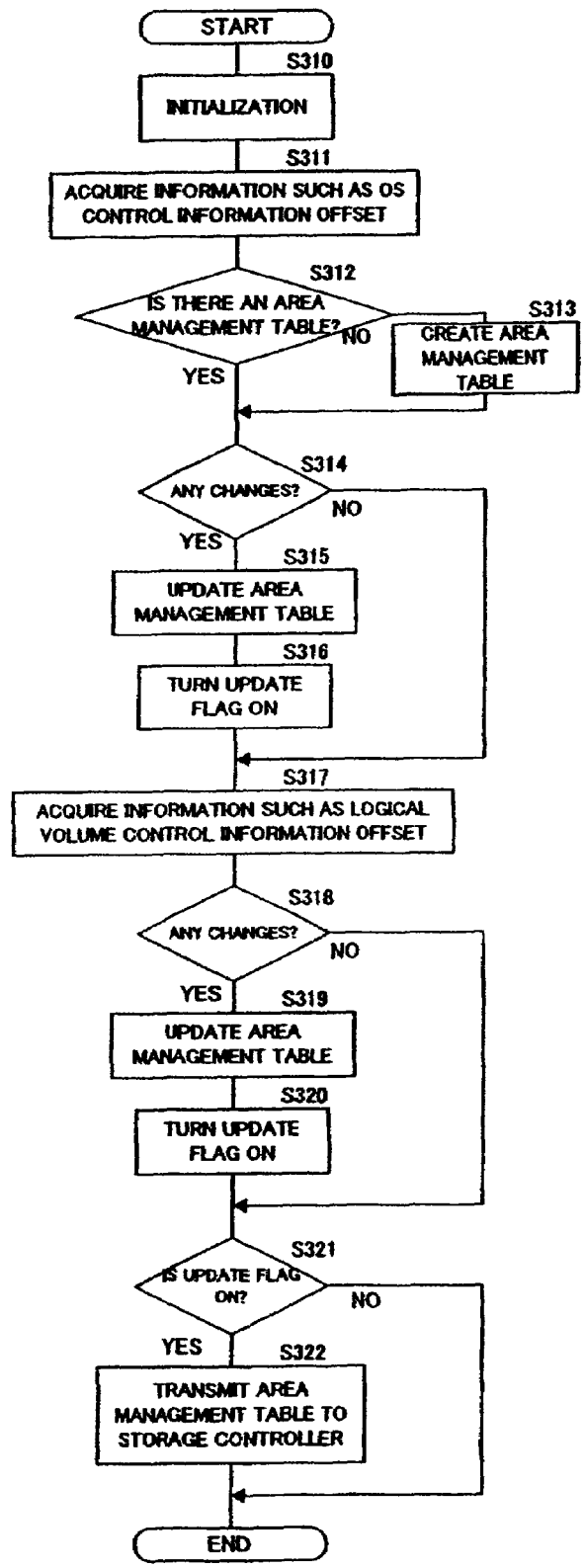
FIG. 3 is a flowchart depicting processing steps that are performed in an embodiment of the present invention when a host computer transmits an area management table to a storage controller.

FIG. 3 is a flowchart depicting processing steps that are followed when the host computer transmits an area management table 25 to the storage controller 10. These processing steps can roughly be divided into two processes: a process in which the area management program 24 acquires an area management table 25 indicative of the latest position; and a process in which the program transmits the acquired area management table 25.

First, the area management program 24 initializes the contents of flags and other items to be used during processing (S310), requests the OS 21 to hand over the latest OS control information offset 211 and OS control information size 212, and acquires such information (S311). Next, the area management program 24 checks whether the area management table 25 exists in the memory 28 of the host computer 20 (S312).

If the area management table 25 is not found in the memory 28, the area management program 24 generates an area management table 25 in the memory 28 (S313). If, on the other hand, the area management table 25 is found in the memory 28, the area management program 24 compares the OS control information offset 211 and OS control information size 212 in the area management table 25 with the acquired OS control information offset 211 and OS control information size 212 (S314). If the contents of the acquired information differ from those in the area management table 25, the area management program 24 updates the table 25 to register the acquired information (S315). After such an update, the area management program 24 turns ON an update flag (S316).

Next, the area management program 24 acquires also the logical volume control information offset 213 and logical volume control information size 214 from the OS 21 and performs a comparison process similar to that for the OS control information. That is, the acquired information and the contents of the area management table 25 in the memory are compared (S317, 318), and if the contents of the acquired information are found to be different from those in the area management table 25, the area management program 24 updates the area management table 25 so as to reflect the acquired information (S319), and turns ON the update flag after such an update (S320).

According to the above-explained procedure, the area management table 25 representing the latest state is generated in the memory 28.

Next, the area management program 24 checks the update flag (S321). When the update flag is ON, the area management program 24 transmits the contents of the area management table 25 stored in the memory 28 to the storage controller 10 (S322). Upon receipt of the area management table 25, the storage controller 10 stores the table in logical device X.

The above-described process for transmitting the area management table 25 from the host computer 20 to the storage controller 10 is performed as necessary, for instance, at the time of starting up the OS 21 in the case where there has been a change in the OS control information or logical volume control information or in the case where the configuration of logical volumes 27 has been changed, for example, if there has been a change in the number of logical devices 18 that compose the logical volumes 27. This ensures that the area management table 25 indicative of the latest status will always be set in the storage controller 10.

=Logical Device Management Table=

Figure 4:
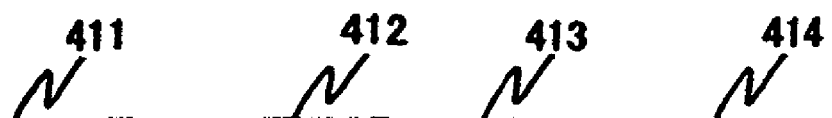
FIG. 4 is a diagram illustrating a logical device management table according to an embodiment of the present invention.

In the control memory 12 of the storage controller 10 is stored a logical device management table 121. An example of a logical device management table is shown in FIG. 4. In relation to a logical device ID 411, this table manages, for example, the following: a LUN (Logical Unit Number) 412, which is unique to each logical device ID 411; a storage capacity 413 of each logical device 18; and a port ID 414, which is the ID of a port 131 of the host interface 13 to which each logical device 18 is connected. The contents of the logical device management table 121 are maintained up-to-date. For example, they are manually updated by an operator with a management terminal (not shown) connected to the storage controller 10 or automatically updated according to, for example, the information stored in the storage controller 10 or transmitted from the host computer 20.

=Data Status=

Next, it will be explained how the data output from an application program 23 running on the host computer 20 is stored in a logical device 18 of the storage controller 10, paying attention to data configuration.

Figure 5A:
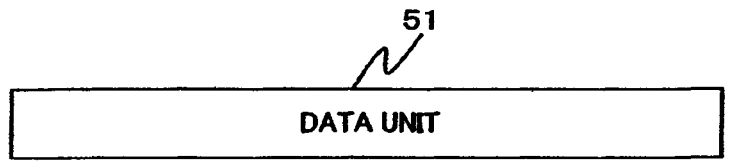
FIG. 5A is a diagram illustrating a data unit that is used in an embodiment of the present invention when an application program performs a data input/output operation to a logical volume.

FIG. 5A illustrates a data unit that is used when an application program 23 performs a data input/output operation to a logical volume 27. The data size of the data unit 51 is equal to the handling data size of the application program shown in FIG. 2.

Figure 5B:
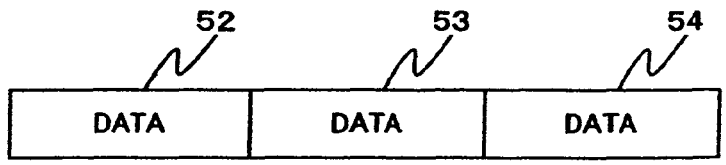
FIG. 5B is a diagram showing how a logical volume management program divides a data unit, which is shown in FIG. 5A, when performing an input/output operation to a storage controller.

FIG. 5B shows how the logical volume management program 22 divides a data unit 51, which is shown in FIG. 5A, when performing an input/output operation to the storage controller 10. In the example shown in this figure, the data unit 51 is divided into three sections: data 52, data 53, and data 54.

Figure 5C:
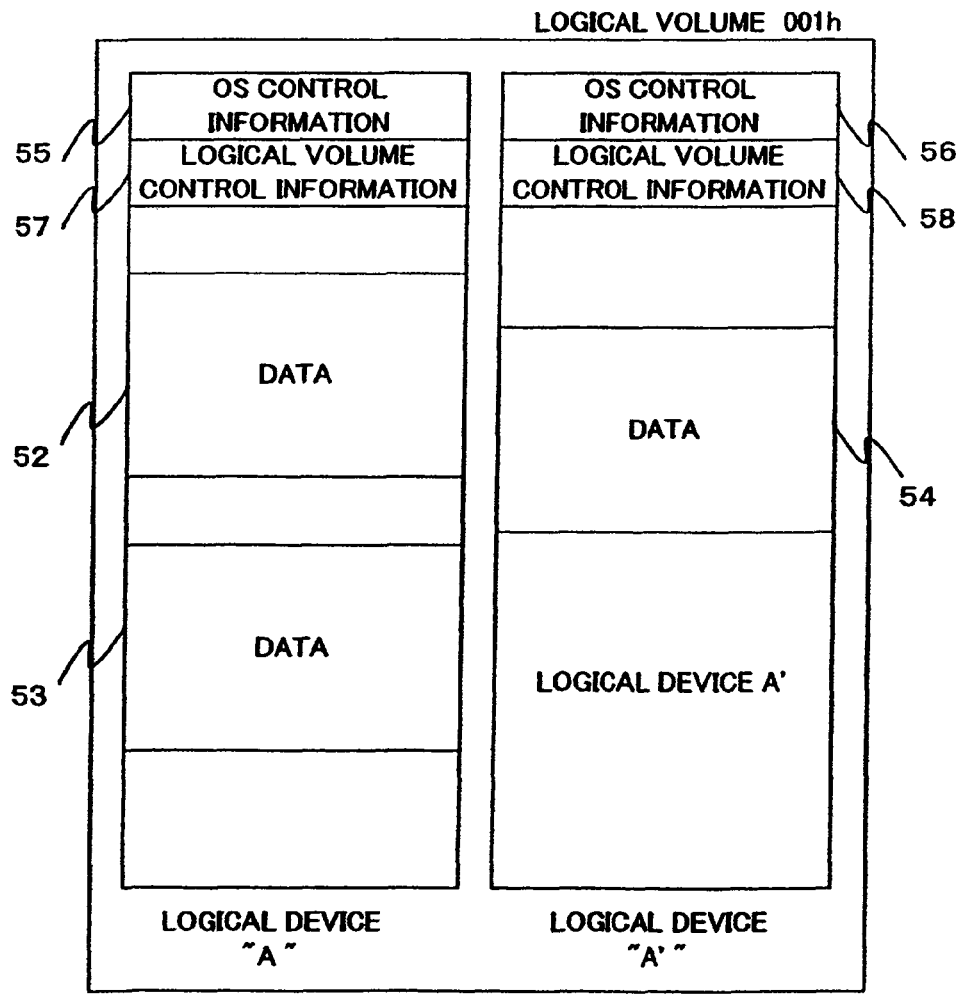
FIG. 5C is a diagram showing how the divided data are stored in a logical device.

FIG. 5C shows how data 52, data 53, and data 54 are stored in the logical devices 18. This figure shows an example where a logical volume 27 having a logical volume ID 210 of "001h", which is designated by an application program 23, is formed by a logical device 18 having a logical device 3D 215 of "A" and a logical device 18 having a logical device 3D 215 of "A'". The divided data 52 and 53 are stored in the logical device 18 having the logical device ID 215 of "A"; the divided data 54 is stored in the logical device 18 having the logical device 3D 215 of "A'".

The fixed areas of these logical devices 18 store the aforementioned OS control information 55, 56 and logical volume control information 57, 58.

Figure 6A:
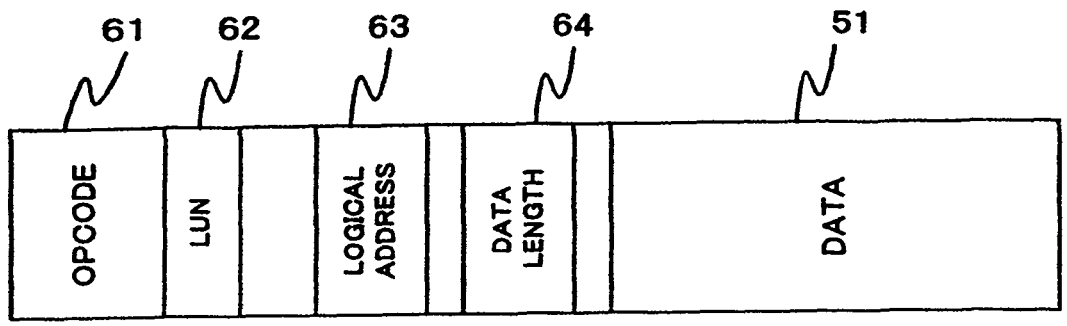
FIG. 6A is a diagram illustrating a data unit, which is shown in FIG. 5A, in a SCSI data format.
Figure 6B:
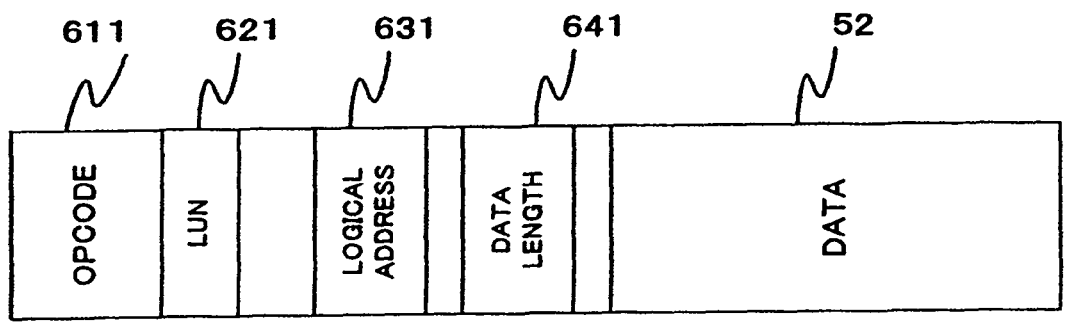
FIG. 6B is a diagram illustrating the data, which is shown in FIG. 5B, in a SCSI data format.
Figure 6B:
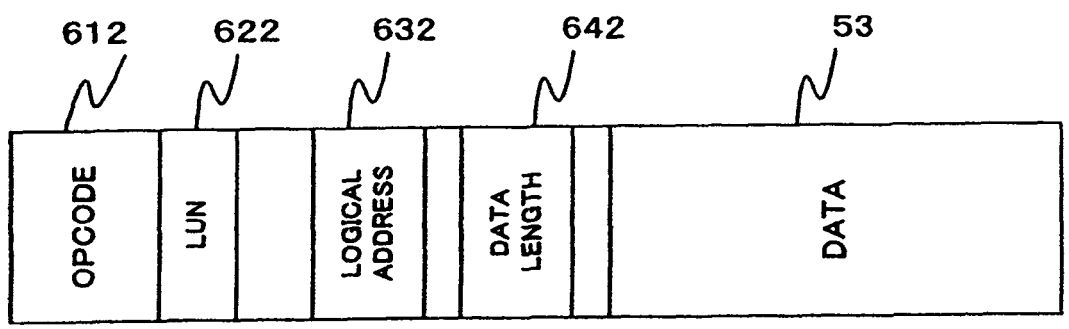
Figure 6B:
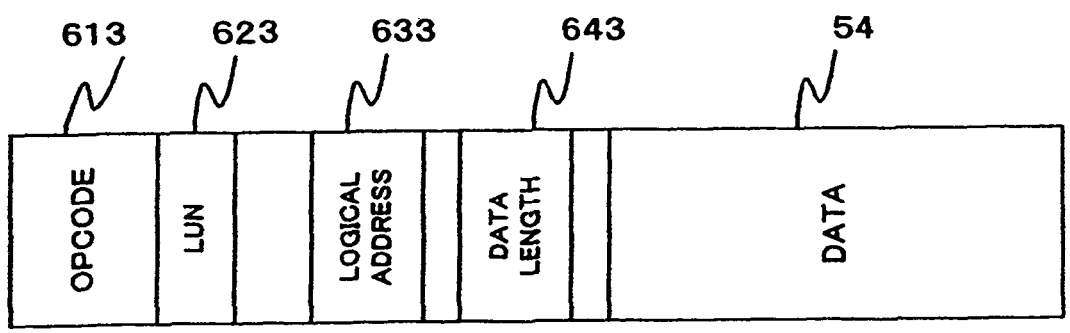

FIG. 6A illustrates a data unit, as shown in FIG. 5A, in a data format complying with the SCSI standard. FIG. 6B illustrates the data presented in FIG. 5B in a SCSI data format.

As illustrated in FIG. 6B, to each of the opcode fields 611 to 613 in a command frame, a command indicating the type of process requested is set. In the examples in this figure, a write command is set. To each of the LUN fields 621 to 623, the logical device 3D 215 or LUN (logical Unit Number) to be the target of process is set. In the examples, "0001h" is set in LUN fields 621 and 622 and "0002h" is set in LUN field 623. To logical address fields 631 to 633 are set the addresses corresponding to the storage-start location (i.e., a location at which storage is to start) in a logical device 18 onto which data 52 to 54 are to be written. To data length fields 641 to 643 are set the data lengths corresponding to the write data 52 to 54 in the respective command frames.

The above description deals with a case where a data write request is output from an application program 23. When a data read request is output, a read command will be set to each of the above-mentioned opcode fields 611 to 613, the addresses for designating the data read start location (i.e., a location at which reading of data is to be started) in a logical device 18 will be set to the logical address fields 631 to 633, and the size of the data to be read will be set to each of the data length fields.

=Data Verification Process=

The data verification process, which is performed by the storage controller 10 when the host computer 20 transmits SCSI data to the storage controller 10, will now be explained.

The data verification process is performed by executing a data verification program 122 (algorithm) that the storage controller 10 stores in its control memory 12. This program thus may serve as "means for verification". The data verification program 122 is prepared for each application program 23 that runs on the host computer 20. The data verification program 122 comprises a function for verifying, before performing processing of target data (i.e., data to be processed), whether the target data complies with a predefined specification, the function performing processing equivalent or superior to the aforementioned algorithm that the application program 23 running on the host computer 20 comprises.

The data verification program 122 is stored in the control memory 12, for instance, through transmission from the host computer 20 or manual operation of an operator working with a management terminal (not shown) for the storage controller 10. To each data verification program 122 to be stored is assigned an ID of the associated application program 23.

The data verification process is for checking whether or not the target data conforms to a predefined specification required by an application program 23. For this reason, among the entire data that has been stored in the storage region of a logical device 18, only the area for storing the data that is input from or output to the application program 23 has to be subjected to the data verification process. Therefore, prior to the data verification process, a process for excluding such an area is performed, as described later.

Figure 7:
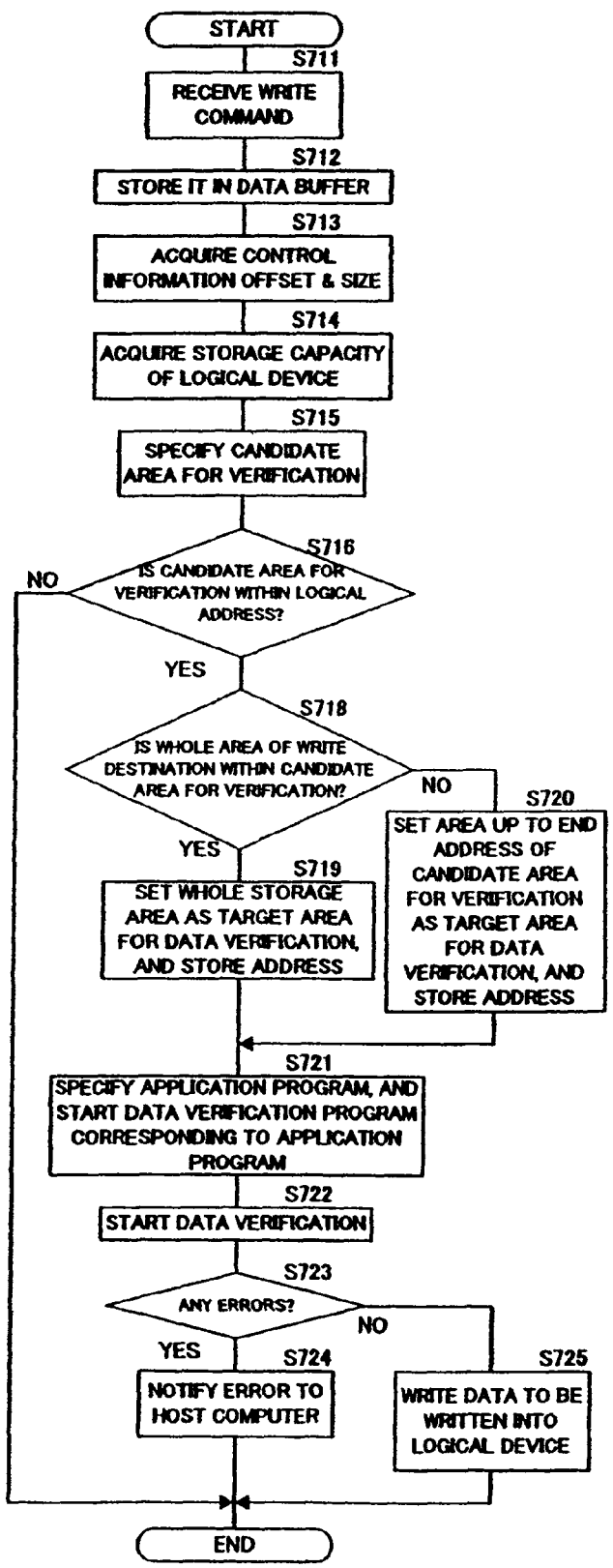
FIG. 7 is a flowchart depicting data verification processing steps that are performed by a storage controller according to an embodiment of the present invention.

Next, explanation will be made of the data verification process performed in the storage controller 10 using the flow-chart shown in FIG. 7, taking a case in which a data write request for writing data 51 shown in FIG. 6A is transmitted from an application program 23 running on the host computer 20 and a write command frame shown in FIG. 6B, which corresponds to the data write request, is transmitted to the storage controller 10. This process is performed, for instance, by a microprogram stored in the control memory 12 of the storage controller 10.

Upon receipt of a command frame carrying a write command from the host computer 20 (S711), the storage controller 10 stores the command frame in a data buffer 16 (S712). The storage controller 10 then refers to an area management table 25 stored in a logical device 18 having a logical device ID of "X" to acquire the OS control information offset 211, the OS control information size 212, the logical volume control information offset 213, and the logical volume control information size 214 for the logical device ID that is set in the received data write request (S713). Further, the storage controller 10 refers to a logical device management table 121 to acquire the storage capacity 413 of the logical device 18 corresponding to the above-mentioned logical device ID (S714).

Next, the storage controller 10 stores the addresses (e.g., at least one start address and end address) for designating, among the whole storage region of the logical device 18 corresponding to the above-mentioned logical device ID, an area or areas except for the areas designated by the above-mentioned OS control information offset 211, the OS control information size 212, the logical volume control information offset 213, and the logical volume control information size 214 (S715). The storage area having been designated by the above addresses is hereinafter referred to as the candidate area for verification.

Next, the storage controller 10 compares the above-mentioned candidate area for verification designated by the addresses with the address that is set in the logical address field 631 to 633 of the received command frame (S716). If the address that is set in the logical address field is not in the candidate area for verification, the data verification process is ended (S717). If, on the other hand, the address is contained in the candidate area for verification, the storage controller 10 further checks whether the whole storage area, which is defined by the address set in the logical address field and the data length set in the data length field 641 to 643 of the received command frame and designated to be the write destination into which the write data is to be written, falls in the candidate area for verification (S718).

If the whole designated storage area is in the candidate area for verification, the storage controller 10 sets the whole storage area, which has been designated as the write destination, as the target area for data verification, and then stores the addresses for defining such an area (e.g., the start and end addresses defining the area) (S719).

If, on the other hand, the whole storage area is not in the candidate area for verification, the storage controller 10 sets the area starting from the above-mentioned logical address contained in the command frame up to the end address of the candidate area for verification as the target area for data verification, and stores the addresses for defining such an area (e.g., the start and end addresses defining the area) (S720).

After the target area for data verification is set as described above, the storage controller 10 obtains the application program ID that is associated with the logical device 18 to be written. It should be noted that the storage controller 10 stores the correspondence indicative of a relation between application IDs and data verification programs 122 provided for each of the application programs 23. Therefore, the storage controller 10 starts the data verification program 122 that is associated with the obtained application program ID (S721).

Upon starting the data verification program 122, the storage controller 10 gives the above-mentioned addresses, which designate the target area for data verification, to the data verification program 122. The data verification program 122 then starts to perform a data verification process in relation to the storage area of the logical device 18 that is designated by the above-mentioned addresses (S722).

If an error is detected during the data verification process performed by the data verification program 122 (S723), the storage controller 10 transmits a message indicative of such error (e.g., a message indicating an illegal request or write error) to the host computer 20 (S724). If no error is detected, the storage controller 10 transmits the write data in the command frame, which is presently stored in the data buffer 16, to the cache memory 15, and writes the data onto the logical device 18 (S725).

The above description deals with a case where the storage controller 10 receives a data write request from the host computer 20. However, when a data read request is received, instead of verifying the data in the command frame, data to be read is read out from a storage device, stored in the data buffer 16, and verified by performing the same process as that for the write command. That is, even when a data read request has been received, the data verification process will be performed and, if any error is detected, the associated error message will be sent to the host computer 20. Accordingly, for example, an application program 23 can be notified of data unsuitability (i.e., that the "suitability" of the data is not assured) before the read data is handed over to the application program 23. It is therefore possible to prevent any data loss and damages in data, and also prevent the application program 23 from performing erratic operations.

As described above, according to the present invention, the storage controller 10 can also acquire information necessary for data verification. Therefore, the data verification process which is usually performed by an application program 23 can also be performed by the storage controller 10. Since the storage controller 10 also verifies the data suitability demanded by an application program 23, it becomes possible to further enhance data management accuracy.

=Others=

It should be noted that in the foregoing description, the logical volume management program 22 is not necessarily an essential structural component.

Further, the entire contents of the area management table 25 does not always have to be transmitted from the host computer 20 to the storage controller 10; it may be configured so that only differential data indicative of differences occurring due to changes in data is transmitted.

When the area management program 24 is to be executed for the first time, nothing is written in the area management table 25 of the host computer 20. In such an instance, it may be configured so that the area management table 25 is transmitted to the storage controller 10 on the assumption that, for instance, some changes have been applied to the area management table 25.

Further, by connecting the host computer 20 to the storage controller 10 with a LAN or like network to transmit the area management table 25 via the LAN, the area management table transmission from the host computer 20 to the storage controller 10 can also be performed with high speed.

Although the preferred embodiment of the present invention has been described in detail, it should be understood that various changes, substitutions and alterations can be made therein without departing from spirit and scope of the inventions as defined by the appended claims.

What is claimed is:

1. A storage system comprising:
a host computer that executes a plurality of database application programs and
a storage controller including a CPU, a control memory, a plurality of disk drives, and an interface for receiving commands from the host computer, the host computer being external to said storage controller,
wherein said storage controller receives a write command for writing data from said host computer to a disk drive of said plurality of disk drives, due to a first database application program of said plurality of database application programs being executed on said host computer,
wherein a data verification program is designated for each of said plurality of database application programs,
wherein said write command comprises a logical address corresponding to a location at which storage is to start for said data to be written to said disk drive, and a data length of said data to be written to said disk drive,
wherein said storage controller stores addresses, including at least a start address and an end address, said addresses designating a candidate area for verification, said candidate area for verification being an area designated from a whole storage region of said disk drive,
wherein said storage controller determines whether said logical address is within said addresses of said candidate area for verification, and when said logical address is within said addresses of said candidate area for verification, said storage controller further determines whether a whole area of a write destination, which is defined by said logical address and said data length received from said write command, is within said addresses of said candidate area for verification,
wherein if said whole area of said write destination is within said addresses of said candidate area for verification, said storage controller sets said whole area of said write destination as a target area for a first data verification,
wherein if said whole area of said write destination is not within said addresses of said candidate area for verification, said storage controller sets an area, which starts from said logical address and ends at said end address of said candidate area for verification, as the target area for said first data verification, wherein after said target area for said first data verification is set, said storage controller performs said first data verification on said data within said storage controller before said data is written to said disk drive, using a data verification program corresponding to said first database application program, wherein if an error is detected by said first data verification, said host computer is provided with notification of said error, and wherein after said storage controller receives a read command from said host computer to read said data written to said disk drive as a result of said write command, said storage controller reads said data, and a second data verification is performed on said data read from said disk drive.

2. The storage system according to claim 1,
wherein said control memory stores said data verification program that is used for performing said first data verification within said storage controller, and
wherein said storage controller is coupled to said host computer via a SAN (Storage Area Network).

3. The storage system according to claim 2,
wherein said data verification program is sent from said host computer for storage in said control memory.

4. The storage system according to claim 1,
wherein said first data verification performed within said storage controller checks whether said data has lost suitability or not.

5. The storage system according to claim 1,
wherein said error is detected when said data loses suitability by an access from a second database application program, by an internal process performed on said storage controller, or through a communication path between said host computer and said interface.

6. The storage system according to claim 1,
wherein said first data verification performed within said storage controller is equivalent to a data verification performed by said first database application program within said host computer.

7. The storage system according to claim 1, further comprising:
a cache memory; and
a data buffer,
wherein said data is received from said host computer and is sent to said data buffer, wherein said data buffer stores said data during said first data verification within said storage controller, and if no error is detected, said data is sent to said cache memory to be written to said disk drive.

8. The storage system according to claim 1,
wherein said second data verification performed on said data read from said disk drive uses the same process of said first data verification for writing data to said disk drive.

9. The storage system according to claim 1,
wherein said storage controller further comprises a data buffer, and
wherein said second data verification performed on said data read from said disk drive, is performed before sending said read data to said first database application program being executed on said host computer, and is performed after said data read from said disk drive is transferred to said data buffer.

10. The storage system according to said claim 1,
wherein said storage controller receives information to perform said first data verification within said storage controller from said host computer.

11. The storage system according to claim 10,
wherein said first data verification determines whether or not said data has lost suitability, and
wherein said data loses suitability by an access from a second database application program, by an internal process performed on said storage controller, or through a communication path between said host computer and said storage controller.

12. The storage system according to claim 1, wherein said second data verification is performed in said storage controller.

* * * * *